United States Patent [19]

Yannai et al.

[11] Patent Number: 5,538,645
[45] Date of Patent: Jul. 23, 1996

[54] PROCESS FOR THE REMOVAL OF SPECIES CONTAINING METALLIC IONS FROM EFFLUENTS

[75] Inventors: Shmuel Yannai, Haifa; Galit Meshulam, Kiryat-Tivon, both of Israel

[73] Assignee: Technion Research & Development Foundation Ltd., Haifa, Israel

[21] Appl. No.: 156,108

[22] Filed: Nov. 22, 1993

[30] Foreign Application Priority Data

Dec. 9, 1992 [IL] Israel .................................. 104036

[51] Int. Cl.$^6$ ........................................................ C02F 1/28
[52] U.S. Cl. .................. 210/670; 210/674; 210/679; 210/684; 210/688; 210/912; 210/913; 210/914
[58] Field of Search ............................ 210/688, 684, 210/685, 670, 674, 673, 912, 913, 914, 679

[56] References Cited

U.S. PATENT DOCUMENTS

| | | | |
|---|---|---|---|
| 4,021,368 | 5/1977 | Nemec et al. | 210/688 |
| 4,612,247 | 9/1986 | Walsh et al. | 210/688 |
| 4,992,179 | 2/1991 | Brierley et al. | 210/688 |
| 4,992,180 | 2/1991 | Onodera et al. | 210/688 |
| 5,055,402 | 10/1991 | Greene et al. | 210/688 |
| 5,211,852 | 5/1993 | Van de Walle et al. | 210/688 |
| 5,279,745 | 1/1994 | Jeffers et al. | 210/688 |

FOREIGN PATENT DOCUMENTS

| | | | |
|---|---|---|---|
| 60-133602 | 7/1985 | Japan | 210/688 |

OTHER PUBLICATIONS

"Biosorbents For Recovery of Metal From Industrial Solutions", by N. Kuyucak et al., Biotechnology Letters, vol. 10, No. 2, pp. 137–142 (1988).

"Accumulation of Metals by Bacteria and Yeasts", by P. Norris et al., Dev. Ind. Microbiology 20, pp. 299–308 (1979).

"The Removal of Cu(ii) From Dilute Aqueous Solutions by Saccharomyces Cerevisiae", by C. Huang et al., Water Research, vol. 24, No. 4, pp. 433–439 (1990).

"Removal of Metal Ions From Aqueous Solutions by Penicillium Biomass: Kinetic and Uptake Parameters" by M. Galun et al., Water, Air and Solit Pollution, 33, pp. 359–371 (1987).

"Manual of Industrial Microbiology", by Demain et al., pp. 102–104 (1986).

*Primary Examiner*—Peter A. Hruskoci
*Assistant Examiner*—Theodore M. Green
*Attorney, Agent, or Firm*—Morgan & Finnegan

[57] ABSTRACT

A process for the removal of species containing metallic ions from effluents by yeast cell walls. The yeasts used are selected from *Saccharomyces cerevisae*, *Saccharomyces uvarum* and *Saccharomyces lipolytica*. According to the process, the washed yeast cell walls are first treated by a water soluble aldehyde and after sorbing the metallic ions, the yeast cell walls may regenerated by a mineral acid or a chelate solution such as ethylene-diamine tetraacetic acid, releasing the sorbed metal ions. According to a preferred embodiment, water containing acetone or alcohol is used for washing the yeast cell walls. The sorption by the yeast cell walls is carried out at a pH in the range of 1 to 13 and preferably in the range of 4 to 7. The most preferred aldehyde is selected from formaldehyde and glutaraldehyde or any mixture thereof. The metal sorption process may be carried out batchwise or continuously. In the continuous process, the yeast cell walls are immobilized on porous glass, purified sand or polymers.

10 Claims, 3 Drawing Sheets

PROCESS FOR THE REMOVAL OF SPECIES CONTAINING METALLIC IONS FROM EFFLUENTS

The present invention relates to a process for the removal of species containing metallic ions from aqueous solutions. More particularly the invention relates to a simple and efficient process for the removal of species containing metallic ions from effluents.

BACKGROUND OF THE INVENTION.

A growing awareness of the ecological effects of some toxic metals is evident from various studies and many papers which have appeared during the last ten years on this subject. It has been recognized that biosorbent materials, comprising polysaccharides, proteins and lipids, constitute a potential alternative to conventional methods for the removal of metal ions from effluents and other industrial and domestic waste solutions. Living and non-living cells such as yeasts, fungi, algae and bacteria have been suggested for this purpose, contemplating even a potential method for an industrial recovery of some particular metals, such as mercury, lead and cadmium. The main disadvantage of most microbial cells suggested is the fact that the amount of metal which is adsorbed on the bacteria is relatively small; as a consequence, large amounts of the adsorbent are required. Attempts to increase uptake of metal ions by various treatments have been unsuccessful. Furthermore, recovery of the metal ions from the extract by a mineral acid is difficult since the extract also contains other materials extracted from the cells and large amounts of regenerated biosorbent materials will constitute a burden for their disposal. Moreover, these biosorbents can not be recycled. Furthermore, in most cases the microorganisms employed have had to be grown for this purpose, which necessitates considerable investment. In addition, live biomass can not tolerate high concentrations of metals in the effluent.

In a paper by N. Kuyucak et.al. (Biotechnology Letter's 10, 2, 137–142, 1988), Saccharomyces cerevisiae and *Rhizopus arrhizus* are suggested to be more efficient than algal biomass from *Sargassum natans* and *Ascophyllum nodosum*, for sequestering gold and cobalt from solutions. Biosorption isotherms are presented showing the different adsorptions of the various metal ions, using non-living samples of *Saccharomyces cerevisiae*.

In a paper presented at a Symposium by P. R. Norris and D. P. Kelly (Dev. Ind. Microbiology 20, 299–308,1979), it is mentioned that the adsorption of metal ions was generally greater and more efficient from solutions with yeasts than with bacteria. Cadmium and copper ions were rapidly accumulated by all of the yeasts, with the exception of relatively poor cadmium uptake by *Saccharomyces lipolytica*.

Some inhibition of zinc uptake caused by the presence of other cations has also been reported.

In a recent paper by Chu-Pin Huang et al. (Water Research, 24, 4,433–439,1990) the biosorption of copper by virgin or treated unicellular yeast of tile strain *Saccharomyces cerevisiae* is discussed. The yeast cells were washed, treated with a perchloric acid solution in order to remove surface impurities and further heated at 120° C. to kill the cells before their use in the biosorption process. Huang et al. concluded that for live yeast cells, the uptake of copper takes place in two steps: an initial extracellular adsorption followed by intracellular uptake. However, intracellular uptake should be avoided because a sorbed intracellular metal is difficult to recover by simple acidification.

The above brief review shows the importance attributed to the problem of removing metal ions from aqueous solutions. Considering the severe ecological problems encountered due to pollution by heavy metals, the stringent legislation and implementation, and the measures currently taken to reduce pollution by heavy metals, there is a long felt need for an efficient, cost-effective process for the removal of species containing metallic ions, from effluents. Such a process should use a readily available low-cost biosorbent, and facilitate recovering of adsorbed metals. However, up to now, no such commercial plant exploiting a similar system was known, due to the poor metal adsorption efficiency of the sorbents that had been tested so far, or due to their high production and operation costs.

It is an object of the present invention to provide a simple, fast, efficient and inexpensive process for the removal of species containing metallic ions from effluents by biosorption. It is another object of the present invention to provide a simple process for the removal of species containing metallic ions from effluents, using spent yeasts from the fermentation industry. It is yet a further object of the present invention, to provide a simple process for the removal of species containing metallic ions, where after the sorption of the species containing ions, the contaminated spent yeasts can be recycled for further sorption releasing a high concentration of metallic ion solution, thus alleviating disposal problems and rendering the yeast product suitable for repeated use.

BRIEF DESCRIPTION OF THE INVENTION

The invention relates to a process for the removal of species containing metallic ions from an effluents by biosorption, using yeast cell walls, selected from *Saccharomyces cerevisiae, Saccharomyces uvarum* and *Saccharomyces lipolytica*. The process is characterized by the fact that, the yeasts after washing are treated with a water soluble aldehyde and after sorbing metal ions from the effluent, the treated loaded yeast product is removed and optionally acidified for releasing the adsorbed metallic ions, while the regenerated yeasts are recycled for further biosorption operations. It was surprisingly found that the yeast cell walls after the treatment with aldehyde, wherein a crosslinking with amino groups occurs, exhibited a higher sorption capacity than the same yeast cells which did not undergo this treatment. This was unexpected in view of a report by Galun M. et al. (Water Air Soil Pollut. 33, 359–371, 1987), where it is stated that with a fungus such as Penicillium digitatum, the use of a treatment with formaldehyde did not influence the sorption efficiency of uranyl and even decreased the sorption of nickel ions. Moreover, the fact that the yeast product can be recycled for repeated biosorption, constitutes a significant advantage concerning the disposal problem, compared with known methods. It was found that the preferred aldehydes for the present invention are formaldehyde and glutaraldehyde. Among the metallic ions which are particularly suitable for removal or recovery from effluents, when this is economically feasible, are: Cu, Ni, Cr, Cd, Zn, Hg, Sn, Ag, Au, Al, U and Pb.

DETAILED DESCRIPTION OF THE INVENTION

The term of species containing metallic ions includes: metallic cations, in the form of salts, such as: chlorides, nitrates, carbonates and sulfates, oxides, metallic anions such as $CrO_4^{--}$ and complexes such as $Cu(NH_3)_4^{++}$. Spent yeasts from the fermentation industry, such as from beer, wine and biochemical processes based on fungi may be utilised as a biosolvent. Those types of spent yeasts are abundant and readily available, and in many places are considered as environmental nuisances requiring disposal. It was found that this biosorbent has several characteristics that make it suitable for the present invention such as: mechanical hardness, porosity, particle size and density. Also, it possesses a bread spectrum of variable favourable parameters including insensitivity to a wide range of temperatures and pH values, resistance to solvents, great sorption capacity, etc.

The structure of the above mentioned yeast cell wall consists of polysaccharides composed of mannose and glucose and their derivatives as main monomeric constituents, and lipids, melanines and phosphates as minor ones.

One of the main advantages of sorption by the yeast cell walls, in addition to resolving an ecological problem, is the very low costs and relatively high capacity for some metallic ions uptake, which is considered suitable for commercial applications. It was found, according to the present invention, that the yeast cell walls after crosslinking treatment with a water-soluble aldehyde, possess an outstanding stability due to a net-like formation.

BRIEF DESCRIPTION OF THE DRAWINGS

The structural change in the yeast product after treatment with glutaraldehyde and formaldehyde, appears from the attached three Figures, wherein.

Figure 1:
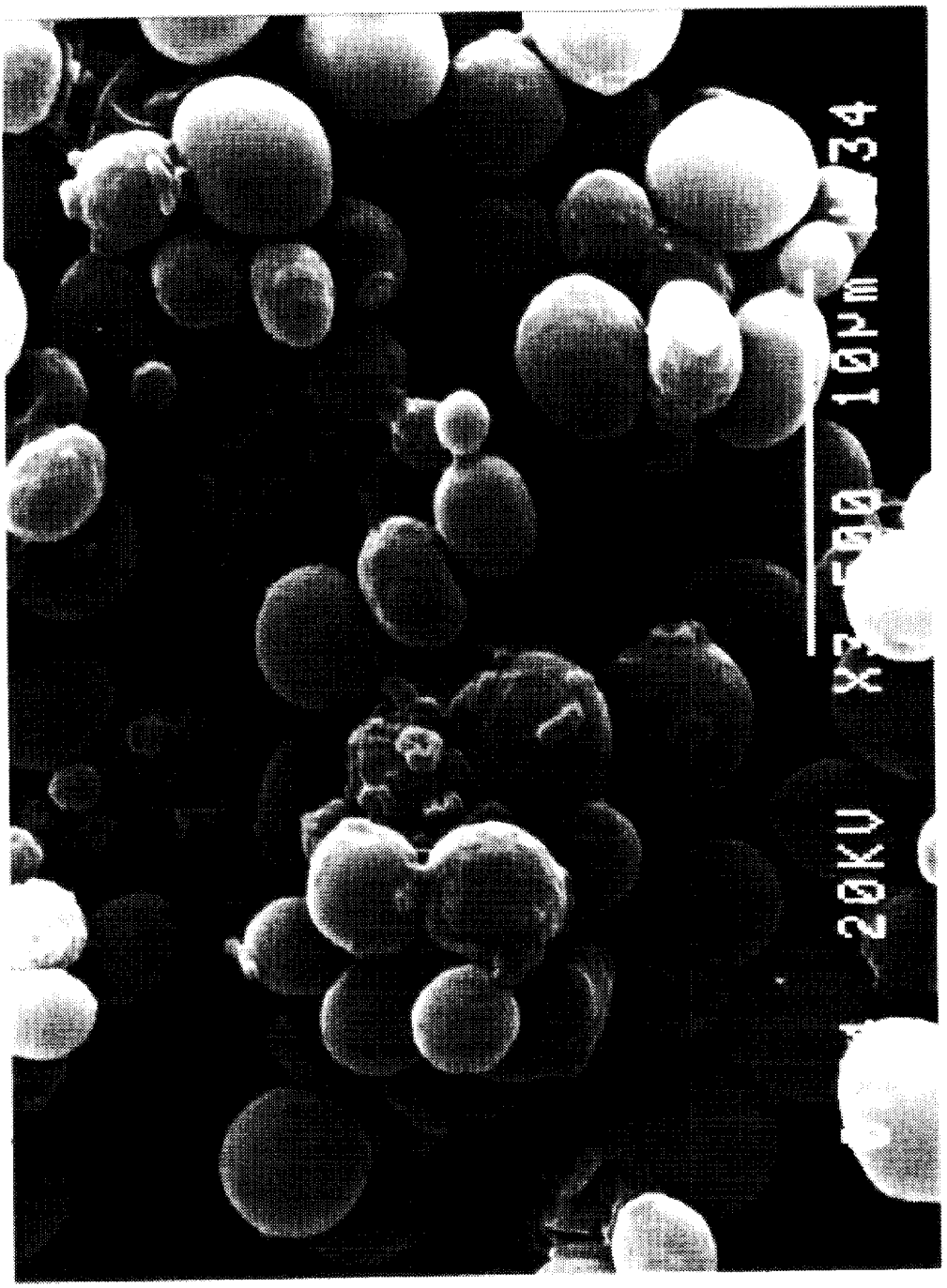
FIG. 1, presents a picture of the beer yeast *Saccharomyces uvarum* cells, after cleaning by washing with water and later with acetone solutions.
Figure 2:
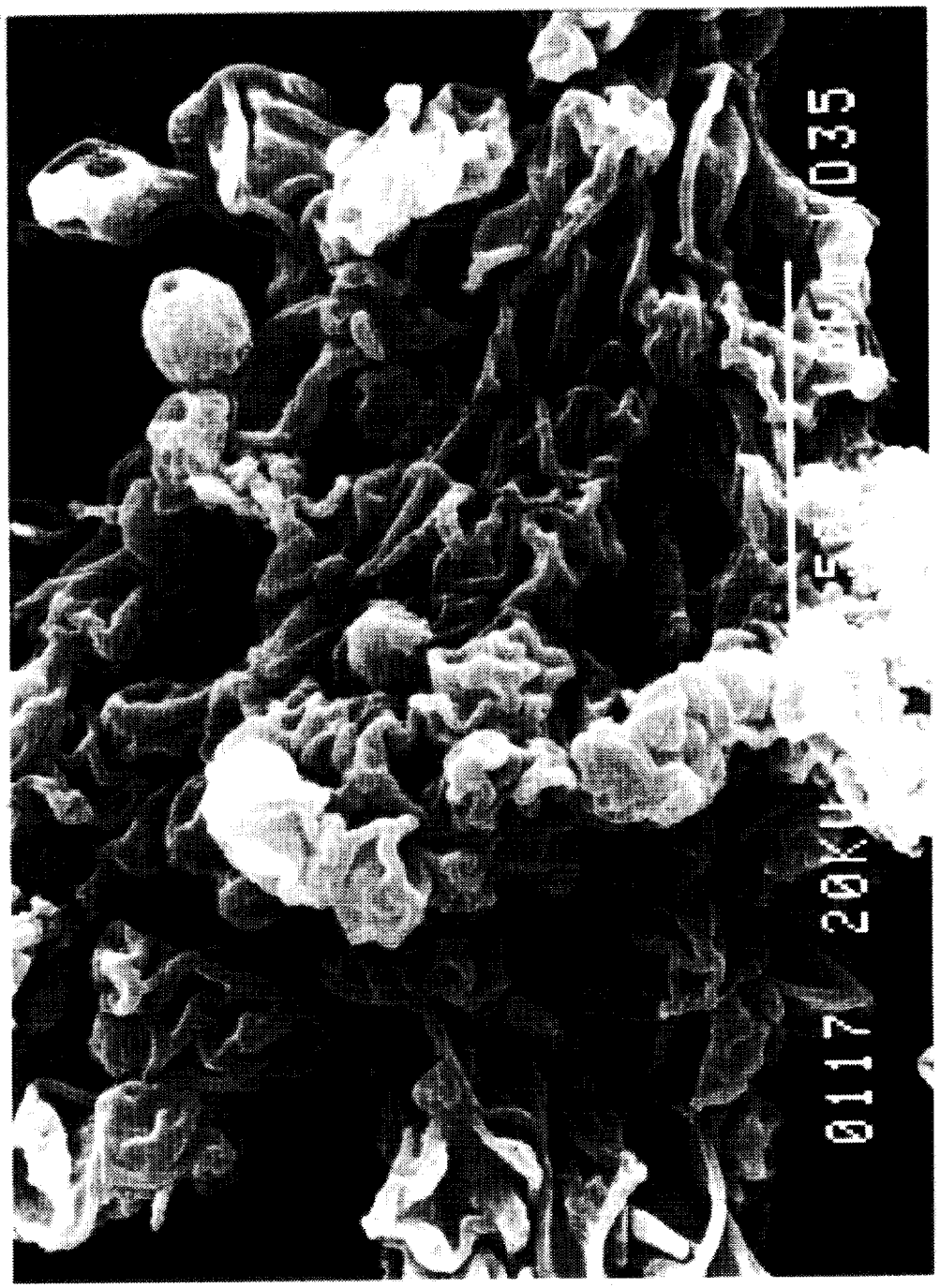
FIG. 2, presents a picture of the beer yeast *Saccharomyces uvarum* cells, after washing and treatment with glutaraldehyde.
Figure 3:
FIG. 3, presents a picture of the beer yeast *Saccharomyces uvarum* cells, after washing and treatment with formaldehyde.

From the above pictures, it can be seen that treatment with aldehyde makes the cell wall thicker, and probably more rigid, than the original cell wall, which seems to impart the above mentioned beneficial properties to the yeast cell wall according to the present invention.

This crosslinking imparts, in addition to the formation of a homogeneous mass, stability for long periods of time, resistance to very low as well as high pH and also an increase in the sorption capacity for various metallic ions. The treated yeast product was found to bind efficiently $Hg^{++}$ and $Pb^{++}$ due to interaction with specific sites in its outer surface, at room temperature. For example, from a two liters solution containing 100 ppm of $Pb^{++}$ or $Hg^{++}$, using of 2.75 g of the dry yeast product after treatment with glutaraldehyde. An efficiency of adsorption of more than 90%, of each of the above cations was achieved. No difference in adsorption efficiency was found in the range of 10° C. to 40° C.

The pH at which the sorption operation is carried out, may be in a very broad range of 1 to 13 depending on the type of species containing metallic in question ions. In most cases the preferred range is between 4 to 7.

The release of the species containing metallic ions from the loaded yeast product, may be carried out by elution with a mineral acid or a chelator solution. The preferred mineral acid for metallic cations is hydrochloric acid. The depleted yeasts thus obtained may be reutilized For additional sorption runs of species containing metallic ions, with substantially the same efficiency as in the first run.

The process may be carried out either batchwise or continuously in columns or reactors. Of course, the continuous biosorption is in many cases much more attractive from an industrial point of view. When the process is carried out in columns, as is done in ion exchange or with activated carbon operations, the yeast preparation will be immobilized to an inert material such as porous glass, purified sand or polymers. In this case the maximum adsorption capacity of the immobilized yeast product may be lower than with the non-immobilized one. On the other hand, tests carried out with continuous sorption followed by regeneration of the immobilized yeast product packed in the column, show that this was very efficient. It was surprisingly found that the immobilized yeast product was not compressed in the column during the operation and no apparent changes occur in the product which may interfere with its suitability for subsequent biosorption operation runs.

The process comprises the following four main steps: In the first one, the yeasts, such as those received from a fermentation factory, are washed with water, preferably deionized water followed by a further washing with a solution of acetone or alcohol in water. This washing step is described by Demain et al. (Manual of Industrial Microbiology, p. 102–104, 1986). The preferred volumes ratio between the yeasts and the wash solution ranges from 1 to 3. The acetone prevents any microbial contamination. The washed yeasts are subsequently precipitated using known means such as centrifugation, filtration or other separation techniques.

The second step, the most important according to the present invention, consists of crosslinking the washed yeast cell wall polymers with a solution of a water soluble aldehyde. A reaction occurs between the carbonyl group of the aldehyde and the amino groups present in the yeast cell wall polymers. It was found that using this step, the sorption of metallic ions by the treated yeast preparation was significantly increased. The treated yeast preparation is further washed with water. The concentration of the dry matter in the product is about 18%.

In the third step, the yeast preparation is used for sorption of species containing metallic ions. This step is carried out usually at ambient temperature, although at higher or lower temperatures no significant changes sorption efficiency were noticed. The most preferred at which the sorption is carried out is in the range of between 4.0 to 7.0, although lower or higher pH values may also be used. The sorption capacity for metallic ions depends on the particular metal but generally is in the order of 0.5 mmol per gram of dry yeast preparation used. A higher concentration of the metal ion in the effluent will also increase the sorption per weight unit of yeast preparation. However, when a mixture of two or more metals are present the adsorption efficiency for each metal may differ.

In the last step, the loaded yeast preparation with the species containing metal ions is separated. When the recovery or regeneration is feasible economically, the loaded yeast preparation is treated with an acidic solution, such as hydrochloric acid. Sulfuric acid or a chelate solution such as ethylene-diamine tetraacetic acid, whereby the metal is released as a salt, while the regenerated yeast can be used for additional sorption runs. There is a difference in the sorption efficiency of the various metallic ions and their corresponding release from the loaded yeast preparation.

The adsorption capacity of the yeast preparation is much higher than that of some known adsorbents. For example, from 1000 ml effluent containing 100 ppm of lead, the yeast cell wall treated with glutaraldehyde had an adsorbtion capacity at least eight fold higher than that of activated carbon under the same experimental conditions.

In case of a continuous sorption, carried out in a column, the yeast preparation is immobilized by covalent binding, to a porous glass, purified sand or polymer. After the sorption, an acid solution or chelate solution is percolated through the column, which can be used repeatedly in further sorption operations.

It was found that the anion bound to some of the metallic cations such as nitrate or sulfate, does not interfere with the sorption of the metallic ions. This is an additional advantage of the process, since it is applicable to broad types of effluent.

Compared with the known method where live microorganisms were used for the sorption of metal ions, in the suggested process which employs a non-living yeast preparation, no nutrients have to be added to the medium and the effluent to be treated may contain very high levels of metallic ions, which are toxic to live organisms. Moreover, due to the fact that the metallic ions are bound to the surface, their release by a mineral acid or a chelator solution, can be easily accomplished.

The invention will be hereafter illustrated by a number of Examples, it being understood that these Examples are presented only for a better understanding of the invention without being limiting thereof, the scope of the invention ion being covered by the appended Claims.

EXAMPLE 1

Spent yeasts belonging to the species *Saccharomyces uvarum*, as received from a factory near Natanya (Israel), were washed with deionized water at a volume ratio of 1 (yeast) to 3 (water). The resulting slurry was introduced into a centrifuge bucket and spun at 8000×g for about 15 minutes. The yeasts were separated and washed again with an aqueous solution containing 50% by volume of acetone, followed by an additional aqueous solution containing 30% by volume of acetone.

The second stage was carried out by treating with an aqueous solution containing 3% (by volume) of glutaraldehyde, at a ratio of 1 volume of the washed yeasts to 10 volumes of the aldehyde solution. After a thorough mixing, the pH was adjusted to about 7 by addition of a solution of sodium hydroxide having a concentration of 2.5 N. The mixture was stirred overnight at 32° C. The stabilized yeasts were separated by centrifugation then washed several times with water and kept into a closed vessel until used.

Fifteen grams of the yeast preparation, which correspond to 2.75 grams of dry matter (after drying at 110° C.), were mixed separately with 5 liters of a solution containing mercury or lead ions at room temperature for 20 min, the pH being about 5.5. The aqueous solution was removed by centrifugation, while the loaded sorbent was found to contain 70 mg of mercury or 100 mg of lead per gram of dry yeast preparation. The concentrations of the metals, before and after the sorption operation, were determined by atomic absorption spectrometry.

The loaded yeasts were mixed with a solution of hydrochloric acid at pH 3.0, in the case of mercury, and pH 1.0 in the case of lead, thus obtaining the respective chlorides of the metals.

EXAMPLE 2

The experiment as described in Example 1 was repeated, except that the recovery of the above metals from the loaded sorbent was carried out by a solution of 1% by wt. of ethylene-diamine tetraacetic acid at a pH ranging from 5.0 to 7.0., for the two metals, using a ratio of 12 volumes of the solution per 1 volume of the loaded sorbent. The recovery of mercury was 60% while that of lead was above 95%.

EXAMPLE 3

An experiment with a continuous operation was carried out using a column containing porous glass beads to which the stabilized yeast preparation was bound covalently. The stabilization of the yeasts was carried out by mixing 2.0 kg of glutaraldehyde solution (3% by volume) with 1 kg of yeast cell walls.

Various solutions containing 40 ppm to 100 ppm of mercury or lead, having a pH of about 5.5, were passed through the column by a peristaltic pump.

The sorption efficiency in this experiment for the respective metals was found to be similar to that observed in the batch operation experiment.

The recovery of the metals from the loaded yeast preparation was carried out with a dilute solution of hydrochloric acid at a pH in the range of 1.0 to 1.5, at room temperature. The dilute solution or hydrochloric acid was introduced at the top of the column. At the bottom of the column, a relatively concentrated solution of the respective metal ions was obtained.

EXAMPLE 4

An amount of 3 grams of yeasts (as in Example 1) treated with formaldehyde, corresponding to 0.5 grams of dry yeast preparation, was mixed with 100 ml of an effluent containing 100 ppm chromium, in the form of $CrO_4^{--}$. After a pH adjustment to 1.0 using hydrochloric acid, the mixture was stirred for about 20 minutes and the aqueous solution was removed by centrifugation. It was found that the yeast preparation reduced the chromium content in the effluent to less than 40 ppm.

EXAMPLE 5

The experiment as in Example 4 was repeated, using the same amount of yeast preparation, for the adsorption of copper present in a solution of 100 ml of copper in the form of complex $Cu(NH_3)_4^{++}{}_2$, the pH being adjusted by a solution of ammonia to about 11.

It was found that the yeast preparation reduced the concentration of copper to less than 15 ppm.

EXAMPLE 6

The experiment as in Example 1, was carried out for the removal of lead from an effluent using the same procedure, except that the recovery of the metal was done by a solution of sulfuric acid at a pH of 1.0. The recovery of the metal was 60%.

We claim:

1. In a process for the removal of species containing metallic ions from effluents by biosorption using yeast cell walls from yeasts selected from the group consisting of *Saccharomyces cerevisae*, *Saccharomyces uvarum* and *Saccharomyces lipolytica*, the improvement which comprises washing said yeasts;

treating the yeasts with a water-soluble aldehyde to crosslink the yeast cell walls and produce a net-like formation;

sorbing the species containing metallic ions onto the yeasts to produce a loaded yeast preparation, said biosorption being carried out at a pH between 4.0 and 7.0;

and stripping the loaded yeast preparation for a further biosorption operation.

2. The process according to claim 1, wherein said aqueous solution used in the stripping of the loaded yeast preparation, selected from hydrochloric acid, sulfuric acid, nitric acid or ethylene diamine tetraacetic acid.

3. The process according to claim 1, wherein said metallic Ion is selected from Cu, Ni, Cd, Zn, Hg, Cr, Pb, Sn, Au, Ag, Al, As and U.

4. The process according to claim 1, wherein said species containing metallic ions, include complexes and anions.

5. The process according to claim 5, wherein said complexes and anions are selected from $Cu(NH_3)_4^{++}$, $CrO_4^{--}$ and $AsO_4^{-3}$ respectively.

6. The process according to claim 1, carried out batchwise.

7. The process according to claim 1, carried out continuously.

8. The process according to claim 1, wherein the yeast preparation is chemically immobilized on an inert material, said inert material being selected from the group consisting of porous glass, purified sand and polymers.

9. The process according to claim 1, wherein the stripping of the yeast cell walls used in the sorption is carried out with an aqueous solution containing acetone.

10. The process according to claim 1, wherein the stripping of the yeast cell walls used in the sorption is carried out with an aqueous solution containing alcohol.

* * * * *